United States Patent [19]

Caropolo

[11] Patent Number: 5,624,205
[45] Date of Patent: Apr. 29, 1997

[54] LANDFILL WATER TREATMENT SYSTEM

[76] Inventor: Frank Caropolo, 1009 Park La. North, Franklin Square, N.Y. 11010

[21] Appl. No.: 559,885

[22] Filed: Nov. 8, 1995

[51] Int. Cl.$^6$ ................................................. B09B 1/00
[52] U.S. Cl. .......................... 405/129; 210/170; 210/901; 405/128
[58] Field of Search .................... 588/259; 405/128, 405/129; 210/170, 901

[56] References Cited

U.S. PATENT DOCUMENTS

| | | | |
|---|---|---|---|
| 4,252,462 | 2/1981 | Klingle et al. | 405/129 |
| 4,335,978 | 6/1982 | Mutch | 210/901 X |
| 4,430,021 | 2/1984 | Wagner et al. | 588/259 |
| 4,592,846 | 6/1986 | Metzger et al. | 405/129 X |
| 4,927,292 | 5/1990 | Justice | 405/129 X |
| 5,199,816 | 4/1993 | Paurat et al. | 405/129 |
| 5,419,655 | 5/1995 | Phillips et al. | 405/128 X |
| 5,513,928 | 5/1996 | Eryou | 405/128 X |

*Primary Examiner*—George A. Suchfield

[57] ABSTRACT

A landfill water treatment system including a fluid impermeable containment portion secured within a landfill area. A series of drainage tubes is arranged within the fluid impermeable containment portion. The drainage tubes have a plurality of perforations therein. The drainage tubes have an exit tube extending outwardly of the containment portion for coupling with a pump for draining of effluents through the drainage tubes. A gravel base disposed within the containment portion over the series of drainage tubes therein.

1 Claim, 3 Drawing Sheets

LANDFILL WATER TREATMENT SYSTEM

BACKGROUND OF THE INVENTION

1. Field of the Invention

The present invention relates to a landfill water treatment system and more particularly pertains to removing landfill effluent via a series of drainage tubes with a landfill water treatment system.

2. Description of the Prior Art

The use of treatment systems is known in the prior art. More specifically, treatment systems heretofore devised and utilized for the purpose of providing treatment for disposal are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,354,149 to Breaux discloses an in-ground barrier system with pass-through.

U.S. Pat. No. 5,171,434 to Anderson, Jr. et al. discloses an effluent recycling sanitation system.

U.S. Pat. No. 5,271,851 to Nelson et al. discloses an integrated treatment system for refinery oily sludges.

U.S. Pat. No. 5,145,492 to Weiergraber discloses an apparatus for the treatment of filter sludge consisting predominantly of diatomite and method of operating same.

U.S. Pat. No. 5,276,255 to Stark discloses a cementitious encapsulation of waste materials and/or contaminated soils containing heavy metals, the render them immobile.

U.S. Pat. No. 5,164,174 to Banker et al. discloses a detoxification of aluminum spent potliner by thermal treatment, lime slurry quench and post-kiln treatment.

While these devices fulfill their respective, particular objective and requirements, the aforementioned patents do not describe a landfill water treatment system for removing landfill effluent via a series of drainage tubes.

In this respect, the landfill water treatment system according to the present invention substantially departs from the conventional concepts and designs of the prior art, and in doing so provides an apparatus primarily developed for the purpose of removing landfill effluent via a series of drainage tubes.

Therefore, it can be appreciated that there exists a continuing need for new and improved landfill water treatment system which can be used for removing landfill effluent via a series of drainage tubes. In this regard, the present invention substantially fulfills this need.

SUMMARY OF THE INVENTION

In the view of the foregoing disadvantages inherent in the known types of treatment systems now present in the prior art, the present invention provides an improved landfill water treatment system. As such, the general purpose of the present invention, which will be described subsequently in greater detail, is to provide a new and improved landfill water treatment system and method which has all the advantages of the prior art and none of the disadvantages.

To attain this, the present invention essentially comprises a fluid impermeable containment portion comprised of an open top, a closed bottom, a front wall, a rear wall, and two side walls. The two side walls angle inwardly towards the closed bottom. The containment portion is secured within a landfill area. A series of drainage tubes are arranged within the closed bottom of the fluid impermeable containment portion. The drainage tubes have a plurality of perforations therein. The drainage tubes have an exit tube extending outwardly of the front wall of the containment portion. A gravel base is disposed within the closed bottom of the containment portion over the series of drainage tubes therein. A pump is secured outwardly of the front wall of the containment portion. The pump is coupled with the exit tube of the series of drainage tubes. The pump has a discharge tube extending outwardly therefrom to couple with a storage tank.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved landfill water treatment system which has all the advantages of the prior art treatment systems and none of the disadvantages.

It is another object of the present invention to provide a new and improved landfill water treatment system which may be easily and efficiently manufactured and marketed.

It is a further object of the present invention to provide a new and improved landfill water treatment system which is of durable and reliable construction.

An even further object of the present invention is to provide a new and improved landfill water treatment system which is susceptible of a low cost of manufacture with regard to both materials and labor, and which accordingly is then susceptible of low prices of sale to the consuming public, thereby making such a landfill water treatment system economically available to the buying public.

Still yet another object of the present invention is to provide a new and improved landfill water treatment system which provides in the apparatuses and methods of the prior art some of the advantages thereof, while simultaneously overcoming some of the disadvantages normally associated therewith.

Even still another object of the present invention is to provide a new and improved landfill water treatment system for removing landfill effluent via a series of drainage tubes.

Lastly, it is an object of the present invention to provide a new and improved landfill water treatment system including a fluid impermeable containment portion secured within a landfill area. A series of drainage tubes is arranged within the fluid impermeable containment portion. The drainage tubes have a plurality of perforations therein. The drainage tubes have an exit tube extending outwardly of the containment portion for coupling with a pump for draining of effluents through the drainage tubes. A gravel base disposed within the containment portion over the series of drainage tubes therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

With reference now to the drawings, and in particular, to FIGS. 1–6 thereof, the preferred embodiment of the new and improved landfill water treatment system embodying the principles and concepts of the present invention and generally designated by the reference number 10 will be described.

Specifically, it will be noted in the various Figures that the device relates to a new and improved landfill water treatment system for removing landfill effluent via a series of drainage tubes. In its broadest context, the device consists of a fluid impermeable containment portion, a series of drainage tubes, a gravel base, and a pump. Such components are individually configured and correlated with respect to each other so as to attain the desired objective.

Figure 1:
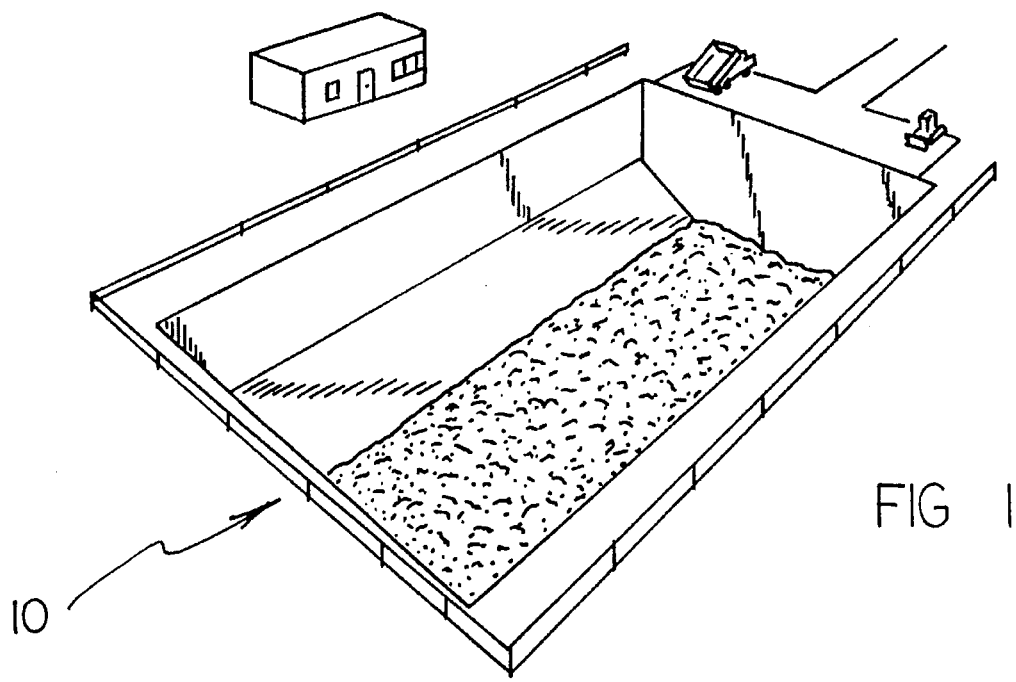
FIG. 1 is a perspective view of the preferred embodiment of the landfill water treatment system constructed in accordance with the principles of the present invention.
Figure 2:
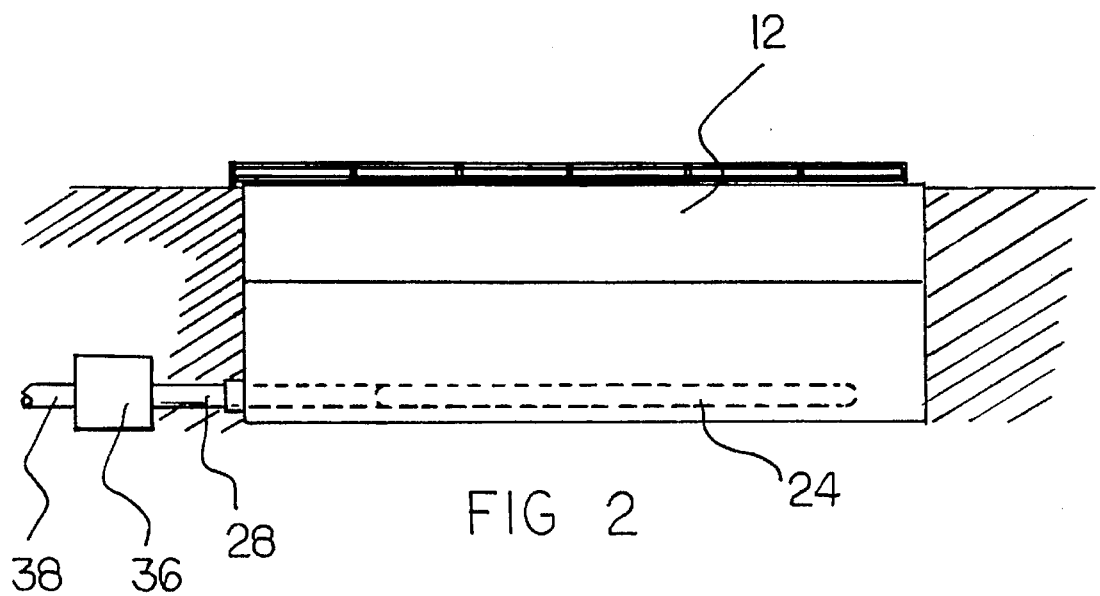
FIG. 2 is a side elevation view of the present invention.
Figure 3:
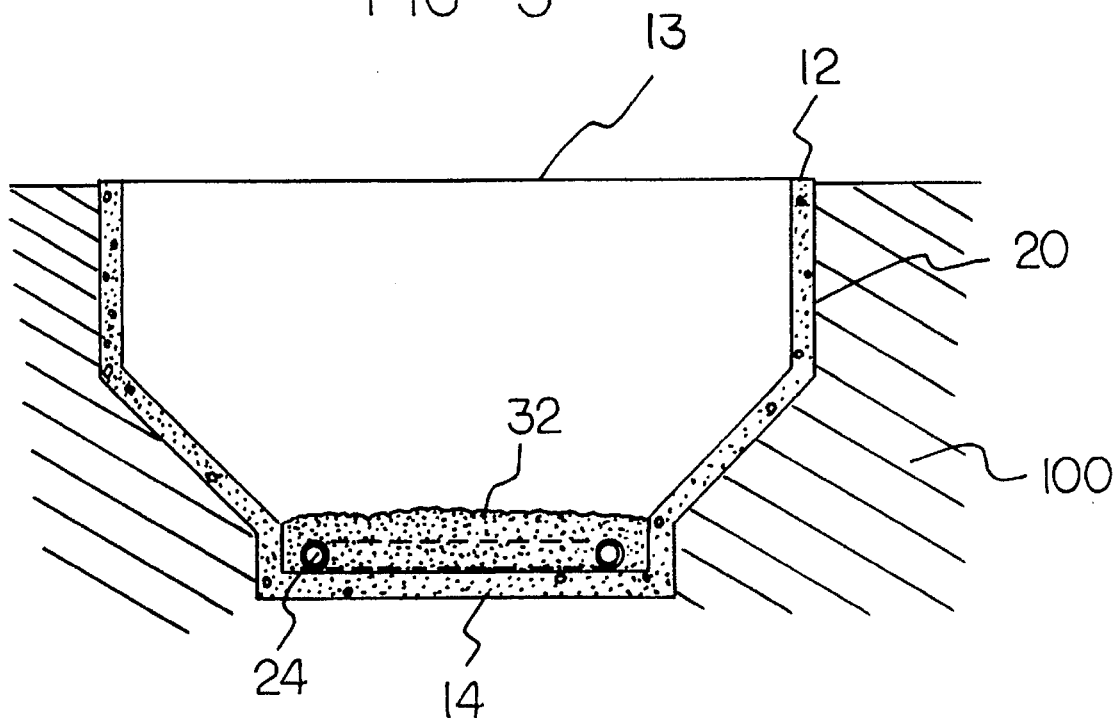
FIG. 3 is a front view of the present invention shown in cross-section.
Figure 4:
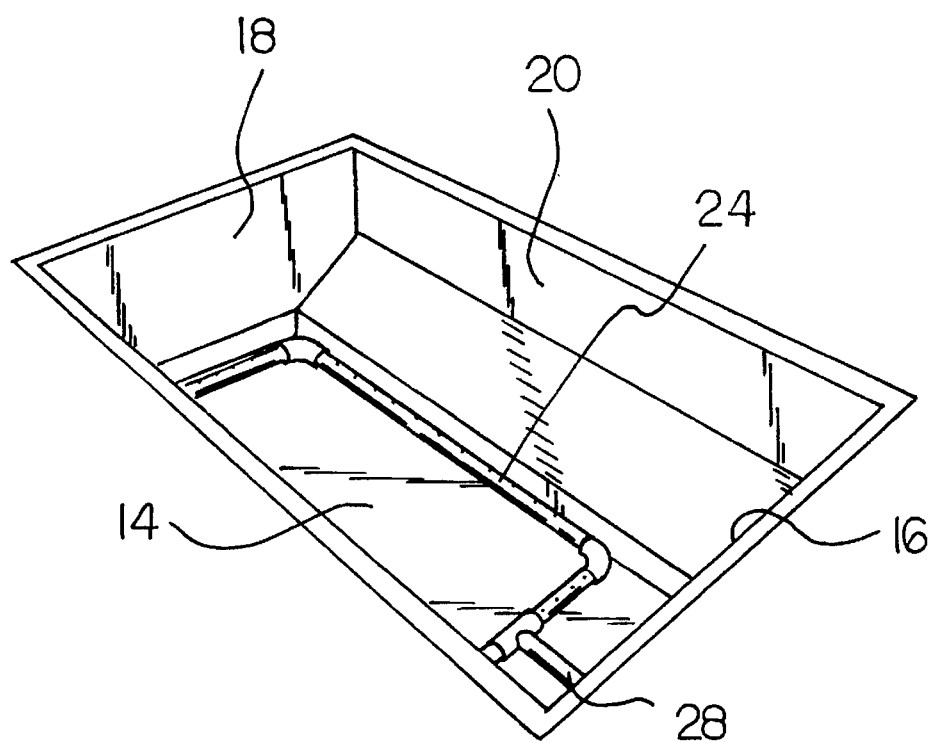
FIG. 4 is a perspective view of the present invention illustrating the drainage tubes.
Figure 5:
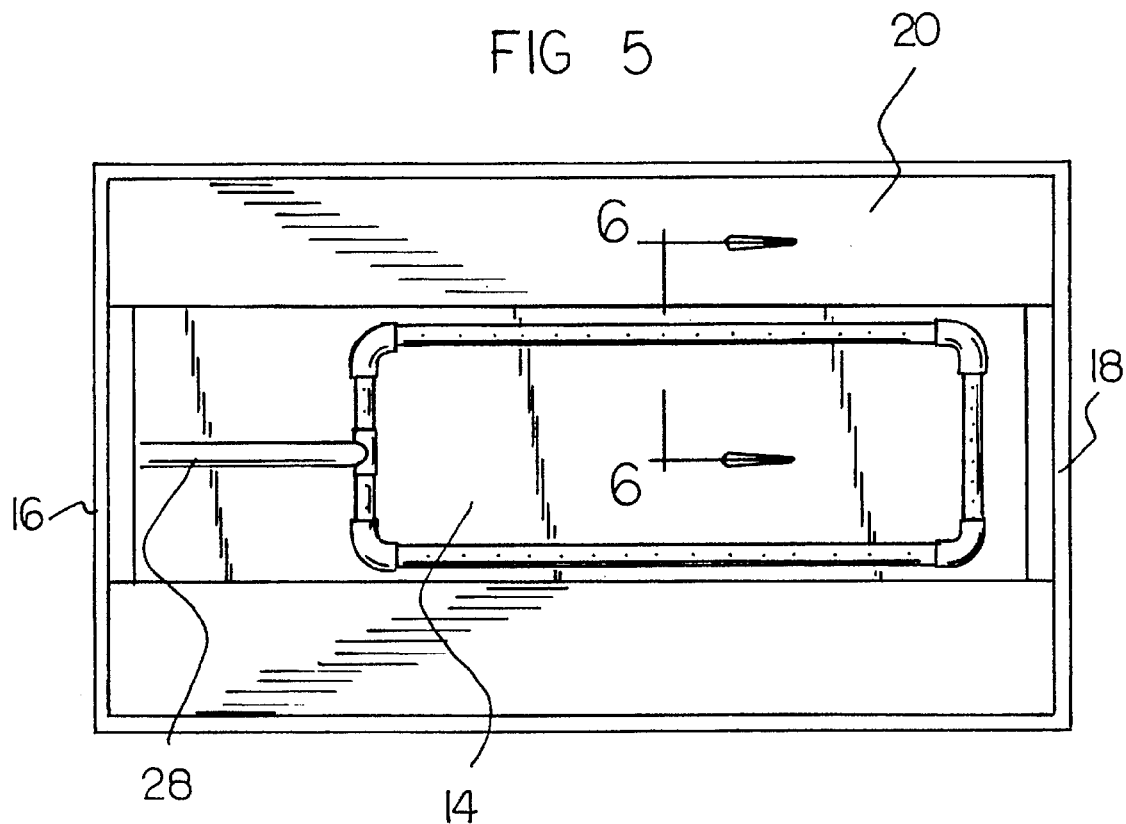
FIG. 5 is a plan view of the preferred embodiment of the present invention.
Figure 6:
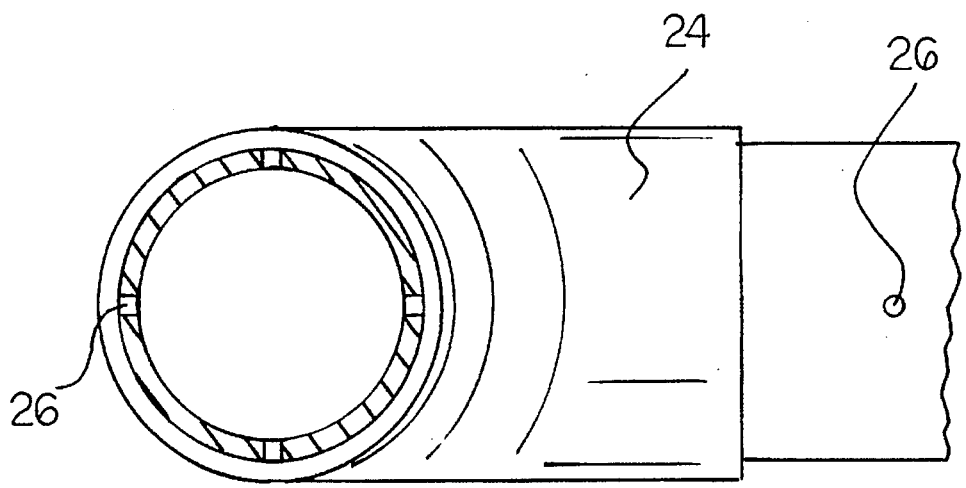
FIG. 6 is a cross-sectional view as taken along line 6—6 of FIG. 5.

The device 10 includes a fluid impermeable containment portion 12 comprised of an open top 13, a closed bottom 14, a front wall 16, a rear wall 18, and two side walls 20. The two side walls 20 angle inwardly towards the closed bottom 14. The containment portion 12 is secured within a landfill area 100. The containment portion 12 is constructed of cement to preclude the permeation of contaminated fluids into the ground beneath the containment portion 12. The angled side walls 20 grades the contaminated liquids into the closed bottom 14. The containment portion 12 receives landfill effluent and water that is dumped thereinto via the open top 13 by a disposing vehicle as illustrated in FIG. 1.

A series of drainage tubes 24 are arranged within the closed bottom 14 of the fluid impermeable containment portion 12. The drainage tubes 24 have a plurality of perforations 26 therein. The drainage tubes 24 have an exit tube 28 extending outwardly of the front wall 16 of the containment portion 12. The drainage tubes 24 receive the contaminated liquids therein through the plurality of perforations 26 thereof to be transported out through the exit tube 28. The drainage tubes 24 are constructed of standard PVC piping. The drainage tubes 24 are preferably arranged in a rectangular configuration spaced within the closed bottom 14 of the containment portion 12.

A gravel base 32 is disposed within the closed bottom 14 of the containment portion 12 over the series of drainage tubes 24 therein. The gravel base 32 protects the drainage tubes 24 from becoming damaged and also prevents any objects from obstructing the plurality of perforations 26 while permitting the passage of contaminated fluids therethrough to be received within the drainage tubes 24.

A pump 36 is secured outwardly of the front wall 16 of the containment portion 12. The pump 36 is coupled with the exit tube 28 of the series of drainage tubes 24. The pump 36 has a discharge tube 38 extending outwardly therefrom to couple with a storage tank. The pump 36 draws the contaminated fluids out of the containment portion 12 through the series of drainage tubes 24. The pump 36 then sends the contaminated fluids to the storage tank for later disposal or to a sewage treatment facility.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A landfill water treatment system for removing landfill effluent via a series of drainage tubes comprising, in combination:

a singular fluid impermeable containment portion comprised of an open top, a closed bottom, a front wall, a rear wall, and two side walls, the closed bottom being of a reduced area as compared to the open top, the two side walls including upper extents and lower extents, the upper extents being essentially perpendicular to the open top and the closed bottom, the lower extents angling inwardly from lower ends of the upper extents to the closed bottom, the containment portion secured within a landfill area, the containment portion receiving landfill effluent thereinto via the open top;

a series of drainage tubes arranged within and extending around a perimeter of the closed bottom of the fluid impermeable containment portion in an essentially rectangular configuration, the drainage tubes having a plurality of perforations therein, the drainage tubes having an exit tube extending outwardly of the front wall of the containment portion;

a gravel base disposed within the closed bottom of the containment portion over the series of drainage tubes therein;

a pump secured outwardly of the front wall of the containment portion, the pump being coupled with the exit tube of the series of drainage tubes, the pump having a discharge tube extending outwardly therefrom to couple with a storage tank.

* * * * *